(12) United States Patent
Farooq et al.

(10) Patent No.: US 11,766,990 B1
(45) Date of Patent: Sep. 26, 2023

(54) VEHICLE HOOD ASSEMBLY INCLUDING PEDESTRIAN AIRBAG

(71) Applicant: Ford Global Technologies, LLC, Dearborn, MI (US)

(72) Inventors: S. M. Iskander Farooq, Novi, MI (US); Mohammad Omar Faruque, Ann Arbor, MI (US); Dean M. Jaradi, Macomb, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 17/742,439

(22) Filed: May 12, 2022

(51) Int. Cl.
  *B60R 21/36* (2011.01)
(52) U.S. Cl.
  CPC .................................. *B60R 21/36* (2013.01)
(58) Field of Classification Search
  CPC .......... B60R 21/36; B60R 19/02; B60R 21/34
  See application file for complete search history.

(56) References Cited

U.S. PATENT DOCUMENTS

| | | | |
|---|---|---|---|
| 7,357,212 B2 | 4/2008 | Sasaki et al. | |
| 7,740,097 B2 | 6/2010 | Takahashi et al. | |
| 10,471,927 B1 * | 11/2019 | Gupta | B60R 21/36 |
| 10,967,830 B2 | 4/2021 | Nakamura et al. | |
| 11,014,525 B2 | 5/2021 | Kanno et al. | |
| 11,077,821 B2 | 8/2021 | Kanno et al. | |
| 2004/0262894 A1 | 12/2004 | Kempf | |
| 2005/0230940 A1 | 10/2005 | Alexander et al. | |
| 2013/0333972 A1 | 12/2013 | Rydsmo et al. | |
| 2020/0377048 A1 * | 12/2020 | Umezawa | B60R 21/0134 |

FOREIGN PATENT DOCUMENTS

| | | | |
|---|---|---|---|
| CN | 201132516 Y | 10/2008 | |
| DE | 10213178 A1 * | 2/2003 | B60R 21/36 |
| DE | 102013014206 A1 | 2/2015 | |
| EP | 1319560 A2 | 6/2003 | |
| EP | 2570307 A1 * | 3/2013 | B60R 21/36 |
| EP | 2481647 B1 | 10/2013 | |
| EP | 2570307 B1 | 5/2014 | |
| ES | 2305686 T3 * | 11/2008 | B60R 21/36 |

(Continued)

OTHER PUBLICATIONS

Rach, DE-10213178-A1, Feb. 2003, Machine Translation of Specification.*

(Continued)

*Primary Examiner* — Paul N Dickson
*Assistant Examiner* — Matthew Joseph Ganci
(74) *Attorney, Agent, or Firm* — Frank A. MacKenzie; Bejin Bieneman PLC

(57) ABSTRACT

A hood assembly for a vehicle includes a hood having a vehicle-rearward edge, a vehicle-forward edge, and a top side. The hood assembly includes an airbag supported by the hood and inflatable to an inflated position. The airbag extends vehicle-forward from the vehicle-rearward edge toward the vehicle-forward edge along the top side in the inflated position. The hood assembly includes a spooler supported by the hood, the airbag being between the vehicle-rearward edge and the spooler. The hood assembly includes a tether extending from the spooler to the airbag.

20 Claims, 7 Drawing Sheets

(56) References Cited

FOREIGN PATENT DOCUMENTS

| | | | | |
|---|---|---|---|---|
| JP | 2006219046 A | * | 8/2006 | ............. B60R 21/36 |
| JP | 2006219046 A | | 8/2006 | |
| JP | 2008143301 A | | 6/2008 | |
| KR | 20190059844 A | | 5/2019 | |
| KR | 20200032289 A | | 3/2020 | |

OTHER PUBLICATIONS

Ishikawa, JP 2006219046 A, Aug. 2006, Machine Translation of Specification.*
Fayt, ES-2305686-T3, Nov. 2008, Machine Translation of Specification.*

* cited by examiner

VEHICLE HOOD ASSEMBLY INCLUDING PEDESTRIAN AIRBAG

BACKGROUND

A hood assembly of a vehicle covers a front end of a vehicle and may, for example, extend over components of the vehicle such as components in an engine compartment and/or other components of the vehicle. These components may be hard points relative to the hood assembly. The hood assembly may have crush zones designed to absorb energy between these hard points and a pedestrian during pedestrian impact. Constraints, including packaging constraints under the hood assembly, limit the amount of energy absorption during pedestrian impact.

A vehicle may include a pedestrian airbag deployable during a pedestrian impact to control the kinematics of the pedestrian including at hard points under the hood assembly. The airbag may be inflatable over a hood and/or front bumper of the vehicle. Specifically, the airbag may be a component of an airbag assembly including an inflator that inflates the airbag in response to detected pedestrian impact. However, packaging constraints can affect the ability of the airbag to deploy to desired locations of the hood assembly.

DETAILED DESCRIPTION

Figure 1:
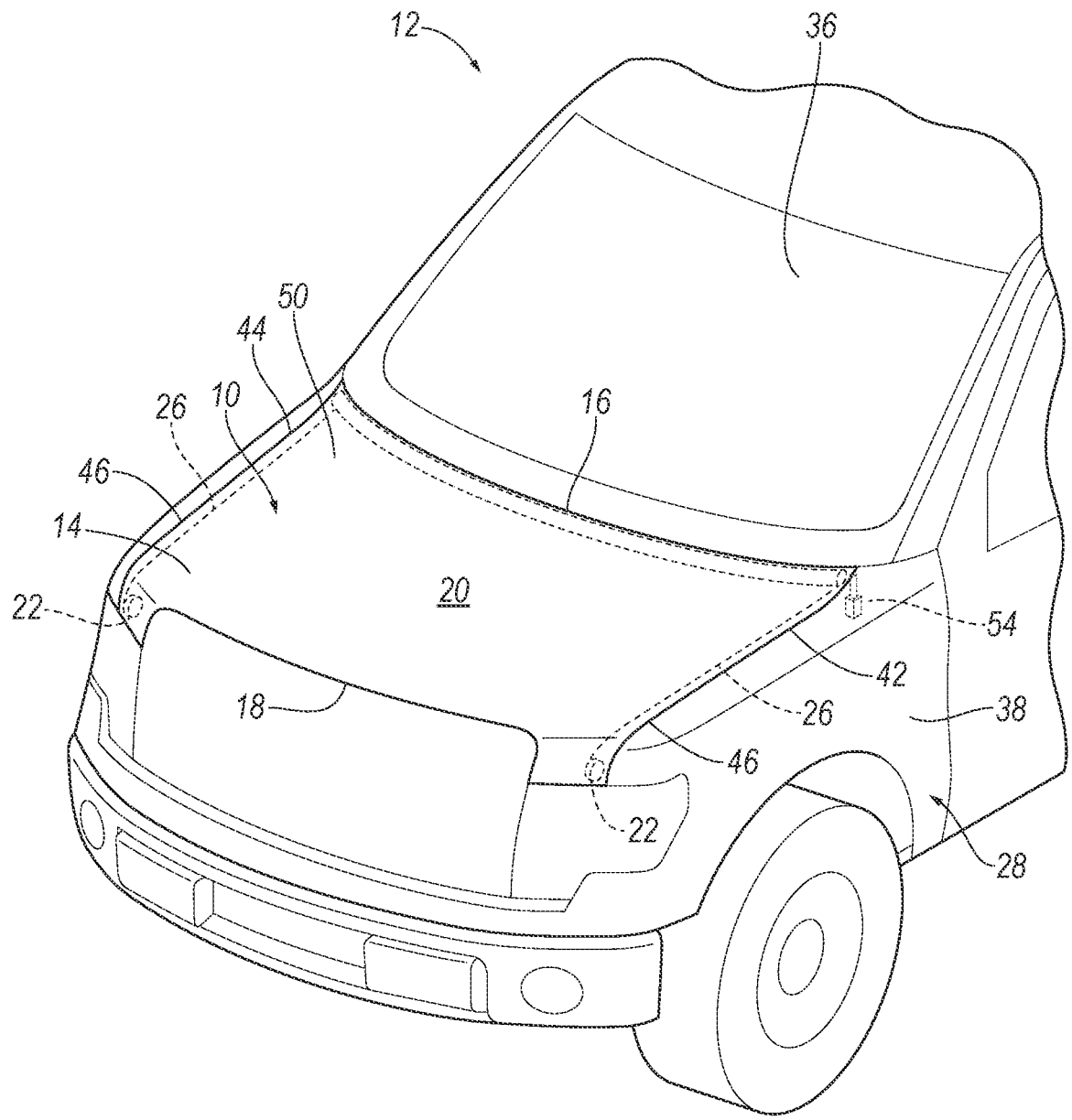
FIG. 1 is a perspective view of a vehicle including a hood and an airbag assembly on the hood in an uninflated position.

A vehicle includes front fenders and a hood between the front fenders. The hood has a vehicle-rearward edge, a vehicle-forward edge, and a top side. An airbag is supported by the hood and is inflatable to an inflated position. The airbag extends vehicle-forward from the vehicle-rearward edge toward the vehicle-forward edge along the top side in the inflated position. A spooler is supported by the hood vehicle-forward of the airbag. A tether extends from the spooler to the airbag.

The hood includes a bottom side and the airbag may be on the bottom side of the hood in an uninflated position. The tether may be on the bottom side of the hood when the airbag is in the uninflated position. The hood defines a gap between the hood and one of the fenders and the tether may be positioned to move through the gap as the airbag inflates from the uninflated position to the inflated position.

The hood defines a gap between the hood and one of the fenders and the tether may extend along the gap from the spooler to the airbag. The hood defines a second gap between the hood and the other of the fenders. A second tether may extend from the airbag along the second gap. The vehicle as set forth in claim 6, further comprising a second spooler, the second tether extending from the second spooler to the airbag.

The airbag may extend from the vehicle-rearward edge to the vehicle-forward edge in the inflated position.

The spooler may be operatively engaged with the tether to retract the tether.

The spooler may be pyrotechnically-activated.

The airbag may be at the vehicle-rearward edge of the hood in an uninflated position.

The vehicle includes a windshield and the airbag is inflatable between the windshield and the vehicle-rearward edge of the hood. The hood has a bottom side and the airbag may be on the bottom side in an uninflated position.

The vehicle may include a hood-lift mechanism between the hood and one of the fenders and configured to raise the vehicle-rearward edge of the hood relative to the fender.

A hood assembly includes a hood having a vehicle-rearward edge, a vehicle-forward edge, and a top side. An airbag is supported by the hood and inflatable to an inflated position. The airbag extends vehicle-forward from the vehicle-rearward edge toward the vehicle-forward edge along the top side in the inflated position. A spooler is supported by the hood and the airbag is between the vehicle-rearward edge and the spooler. A tether extends from the spooler to the airbag.

The hood includes a bottom side and the airbag may be on the bottom side of the hood in an uninflated position. The tether may be on the bottom side of the hood when the airbag is in the uninflated position.

The hood assembly may include a second spooler supported by the hood and a second tether extending from the second spooler to the airbag.

The spooler may be operatively engaged with the tether to retract the tether.

The spooler may be pyrotechnically-activated.

The hood assembly may include a hood-lift mechanism connected to the hood.

With reference to the figures, wherein like numerals indicate like parts throughout the several views, a hood assembly 10 for a vehicle 12 includes a hood 14 having a vehicle-rearward edge 16, a vehicle-forward edge 18, and a top side 20. The hood assembly 10 includes an airbag 24 supported by the hood 14 and inflatable to an inflated position. The airbag 24 extends vehicle-forward from the vehicle-rearward edge 16 toward the vehicle-forward edge 18 along the top side 20 in the inflated position. The hood assembly 10 includes a spooler 22 supported by the hood 14, the airbag 24 being between the vehicle-rearward edge 16 and the spooler 22. The hood assembly 10 includes a tether 26 extending from the spooler 22 to the airbag 24.

Since the airbag 24 extends along the top side 20 of the hood 14, the airbag 24 controls the kinematics of a pedestrian during pedestrian impact. For example, the airbag 24 spaces the pedestrian from relative hard points under the hood assembly 10 and/or reduces the impact velocity of the pedestrian. The spooler 22 and its operation to pull the airbag 24 toward the vehicle-forward edge 18 allows for the airbag 24 to be packaged at the vehicle-rearward edge 16 of the hood 14. This may accommodate for packaging constraints under the hood assembly 10, as described further below.

The vehicle 12 may be any suitable type of automobile, e.g., a passenger or commercial automobile such as a sedan, a coupe, a truck, a sport utility vehicle, a crossover vehicle, a van, a minivan, a taxi, a bus, etc. The vehicle 12, for example, may be an autonomous vehicle. In other words, the vehicle 12 may be autonomously operated such that the vehicle 12 may be driven without constant attention from a driver, i.e., the vehicle 12 may be self-driving without human input.

The vehicle 12 includes a vehicle body 28 and a vehicle frame. The vehicle body 28 may be of a unibody construction in which the frame is unitary with the vehicle frame. As another example, the vehicle body 28 and the vehicle frame may have a body-on-frame construction (also referred to as a cab-on-frame construction) in which the vehicle body 28 and vehicle frame are separate components, i.e., are modular, and the vehicle body 28 is supported on and affixed to the vehicle frame. Alternatively, the vehicle body 28 the vehicle frame may have any suitable construction. The vehicle body 28 and vehicle frame may be of any suitable material, for example, steel, aluminum, and/or fiber-reinforced plastic, etc.

The vehicle body 28 defines a passenger cabin to house occupants, if any, of the vehicle 12. The passenger cabin may extend across the vehicle 12, i.e., from one side to the other side of the vehicle 12. The passenger cabin includes a front end and a rear end with the front end being in front of the rear end during forward movement of the vehicle 12.

The vehicle body 28 and/or the vehicle frame defines a utility compartment 32. The utility compartment 32 is below the hood 14. The utility compartment 32 may, for example, house one or more vehicle components such as powertrain components, e.g., an internal combustion engine, transmission, electric-vehicle batteries, energy-transmission hardware for electric-vehicle operation, etc. In other words, the utility compartment 32 may be a powertrain compartment such as an engine compartment. As another example, the utility compartment 32 may include a storage space, e.g., may be a front trunk (i.e., a frunk).

The vehicle body 28 may include a cowl 34. The cowl 34 supports various vehicle 12 components such as a hood 14, a windshield 36, a dashboard, an instrument panel, etc. The cowl 34 is between the passenger cabin and the utility compartment 32. The cowl 34 may be exposed between a windshield 36 and the hood 14. The cowl 34 may support components such as windshield wiper motors 68, etc.

The windshield 36 is disposed at the front end of the passenger cabin and extends above the instrument panel. The windshield 36 may extend from one side of the vehicle 12 to the other side of the vehicle 12. The windshield 36 may extend from the roof of the vehicle to the instrument panel. The windshield 36 may face in a forward direction from the passenger cabin. The windshield 36 may be any suitably transparent material, including glass such as laminated, tempered glass or plastic.

The vehicle body 28 includes exterior body panels that present a class-A exterior surface. The exterior body panels may be of any suitable material, for example, steel, aluminum, etc. The exterior body panels include front fenders 38, the hood 14, etc.

The front fenders 38 are at a front of the vehicle 12 below the hood 14. The front fenders 38 may extend along the vehicle-longitudinal length of the hood 14 from the vehicle-rearward edge 16 to the vehicle-forward edge 18. The front fenders 38 may extend from a front door to a front bumper of the vehicle 12.

As set forth above, the hood assembly 10 includes the hood 14, the airbag 24, the spooler 22, and the tether 26. The hood 14 covers the utility compartment 32 and vehicle components therein. The hood 14 is rotatable relative to the rest of the vehicle body 28, e.g., relative to the utility compartment 32, between an open position and a closed position. The hood 14 provides access to the utility compartment 32 in the open position and encloses the utility compartment 32 in the closed position. Specifically, the hood assembly 10 may include a hinge 40 rotatably connecting the vehicle 12 hood 14 to the rest of the vehicle body 28. The vehicle body 28 and/or the vehicle frame includes a latch (not shown) between the hood 14 and the vehicle body 28 and/or vehicle frame. The latch selectively fixes the vehicle 12 hood 14 in the closed position.

The vehicle components under the hood 14 may be rigid relative to the hood 14. In other words, during a pedestrian impact, the hood 14 deforms more easily than the vehicle 12 components under the hood 14 during the pedestrian impact. The vehicle components may be, for example, powertrain components, e.g., an internal combustion engine, transmission, electric vehicle batteries, energy-transmission hardware for electric-vehicle operation, etc. As another example, the vehicle components may be vehicle body 28 and or vehicle frame components, e.g., frame rails, shock towers, a cowl 34, etc. As another example, the vehicle 12 components may be steering and/or suspension components, e.g., shocks, struts, etc.

The hood 14 is between the front fenders 38 in a cross-vehicle direction and the hood 14 is between the windshield 36 and a front of the vehicle 12 (e.g., the grille, bumper, etc.) in the vehicle-longitudinal direction. The hood 14 has a left edge 42 and a right edge 44 spaced from each other in the cross-vehicle direction. The vehicle-rearward edge 16 and the vehicle-forward edge 18 are spaced from each other in the vehicle-longitudinal direction. The left edge 42 and the right edge 44 each extend from the vehicle-rearward edge 16 to the vehicle-forward edge 18. The vehicle-forward edge 18 is the forward-most edge of the hood 14 when the hood 14 is in the closed position; the vehicle-rearward edge 16 is the rearward-most edge of the hood 14 when the hood 14 is in the closed position; the left edge 42 is the left-most edge of the hood 14; and the right edge 44 is the right-most edge of the hood 14. The hood 14 defines a gap 46 between the hood 14 and each of the front fenders 38, as described below. Specifically, one gap 46 is between the left edge 42 of the hood 14 a left one of the front fenders 38 and another gap 46 is between the right edge 44 of the hood 14 and a right one of the front fenders 38.

The hood 14 has the top side 20 and a bottom side 48. The top side 20 faces outwardly to the environment surrounding the vehicle 12. The top side 20 has a class-A surface. The bottom side 48 faces an opposite direction than the top side 20. The bottom side 48 faces the utility compartment 32.

The hood 14 may include a hood outer 50 and a hood inner 52 disposed below the hood outer 50. The hood outer 50 is exposed to the environment surrounding the vehicle 12 when the hood assembly 10 is in the closed position. In examples including the hood outer 50 and the hood inner 52, the hood outer 50 includes the top side 20 and the hood inner 52 includes the bottom side 48. The hood outer 50, specifically the top surface, present a class-A surface. The bottom surface on the hood inner 52 faces the utility compartment 32. The inner hood 14 and the outer hood 14 may be the same type of material or different types of material.

The hood outer 50 is fixed relative to the hood inner 52. Specifically, the hood outer 50 is directly or indirectly attached to the hood inner 52. Alternatively, the hood inner 52 and/or the hood outer 50 may include a hem flange connecting the hood inner 52 to the hood outer 50. The hood assembly 10 may include a thermal shield fixed to the hood inner 52 and positioned between the hood inner 52 and the utility compartment 32.

In some examples, the vehicle 12 may include a hood-lift mechanism 54 connected to the hood 14 and to the vehicle body 28 and/or vehicle frame. The hood-lift mechanism 54 may be activated to raise the hood 14, e.g., the vehicle-rearward edge 16 of the hood 14, upwardly relative to the windshield 36, front fenders 38, and utility compartment 32 in response to a vehicle impact. The hood-lift mechanism 54 may raise the hood 14 to increase space between the hood 14 and the vehicle 12 components in the utility compartment 32. Increased space between the hood 14 and the windshield 36, i.e., at the vehicle-rearward edge 16 of the hood 14, provides increased room for movement of the airbag 24 to the inflated position between the hood 14 and the windshield 36. The hood-lift mechanism 54 is shown schematically in FIGS. 1, 2, and 4. The hood-lift mechanism 54 may engage the hood 14 adjacent the vehicle-rearward edge 16 to lift the vehicle-rearward edge 16.

The hood-lift mechanism 54 may be pyrotechnically activated. For example, the hood-lift mechanism 54 may include a base, a rod, and a pyrotechnic charge between the base and the rod. As an example, the base may be mounted to the vehicle body 28 and/or vehicle frame and the rod may be engageable with the hood 14. The pyrotechnic charge may be ignited by an electric impulse, as set forth further below. When the pyrotechnic charge is ignited, the pyrotechnic charge combusts to move the rod relative to the base to an extended position that abuts the hood 14 and pushes the hood 14 upwardly. The hood-lift mechanism 54 may disconnect the hinge between the hood 14 and the vehicle body 28 and/or vehicle frame. In such an embodiment, the base may define a cylindrical chamber and the rod may act as a piston with the pyrotechnic charge between the chamber and the rod.

The vehicle 12 includes an airbag assembly 56 including the airbag 24 and an inflator 58. In some examples, the airbag assembly 56 may include a cover and/or a housing. In examples including a cover, the cover is mounted to the hood 14 and covers the airbag 24 between the cover and the hood 14. In examples including the housing, the housing is mounted to the hood 14 and the airbag 24 is supported by the housing. In such an example, the cover may be mounted to the housing.

The airbag assembly 56 and the hood 14 may be a part in assembly (PIA). In other words, the airbag assembly 56 (including the airbag 24 and the inflator 58) and the hood 14 assembled together may be shipped together as a unit.

Figure 2:
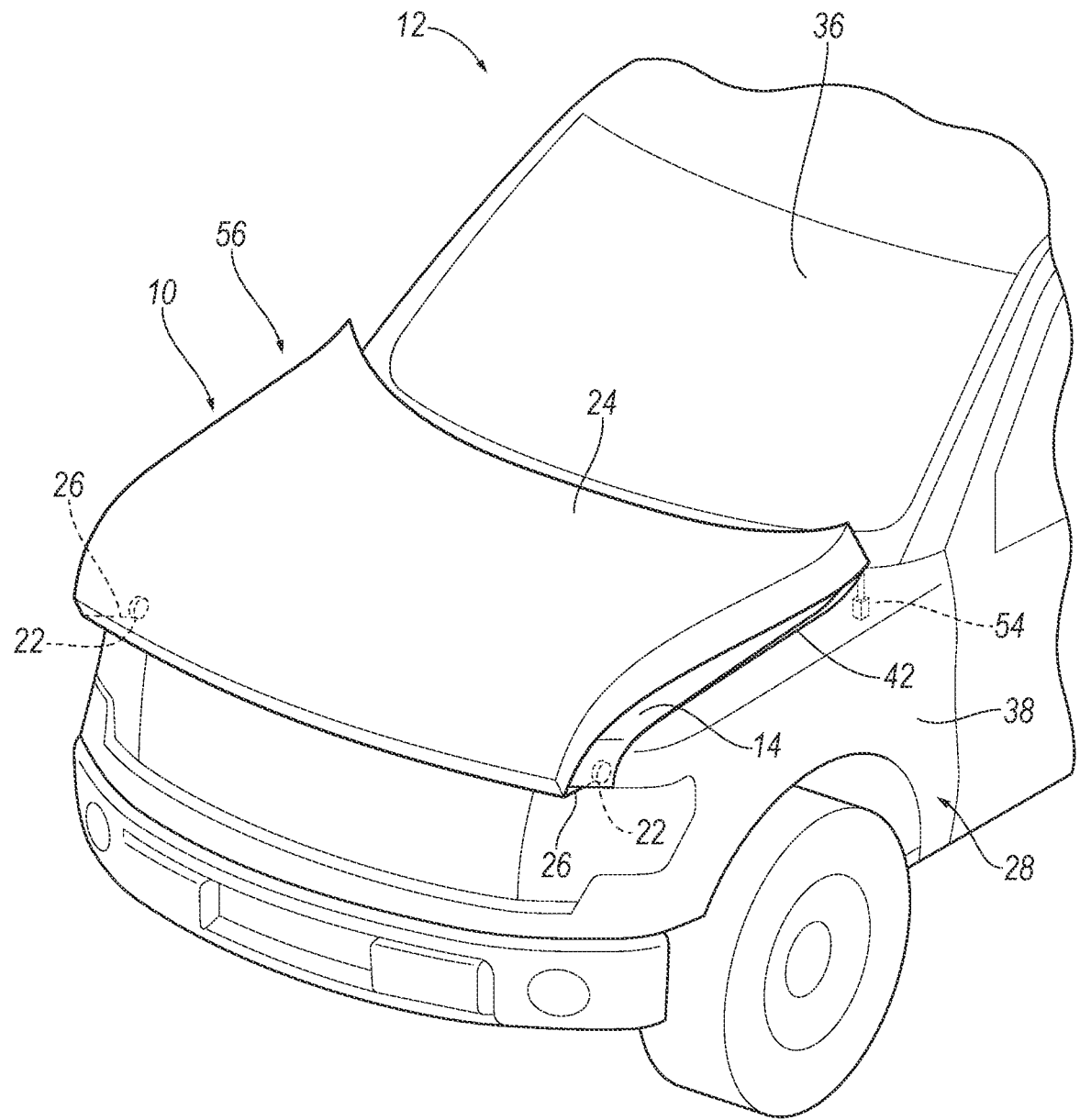
FIG. 2 is a perspective view of the vehicle with one example of the airbag assembly in an inflated position.
Figure 5:
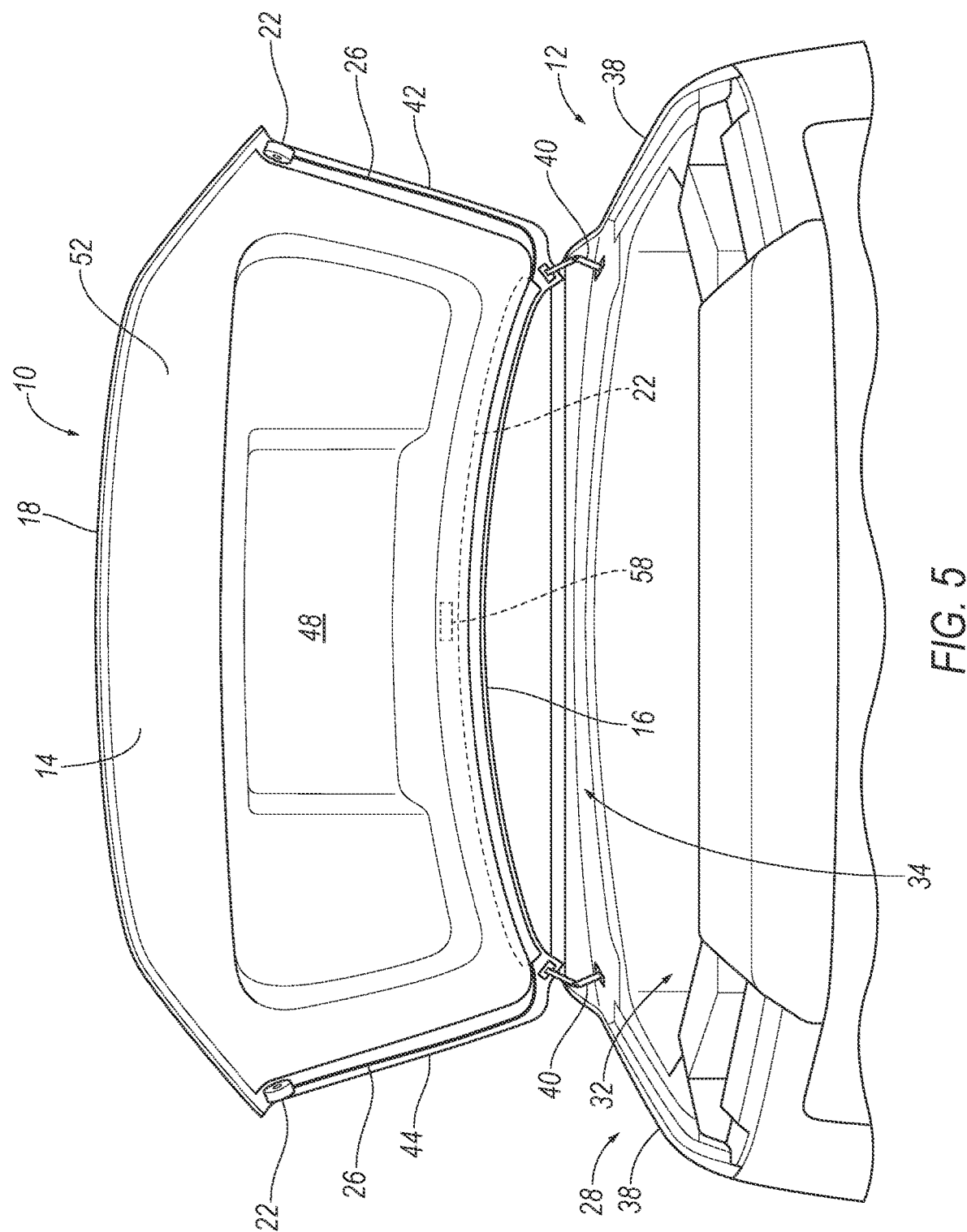
FIG. 5 is a front view of the vehicle with the hood in an open position.
Figure 6:
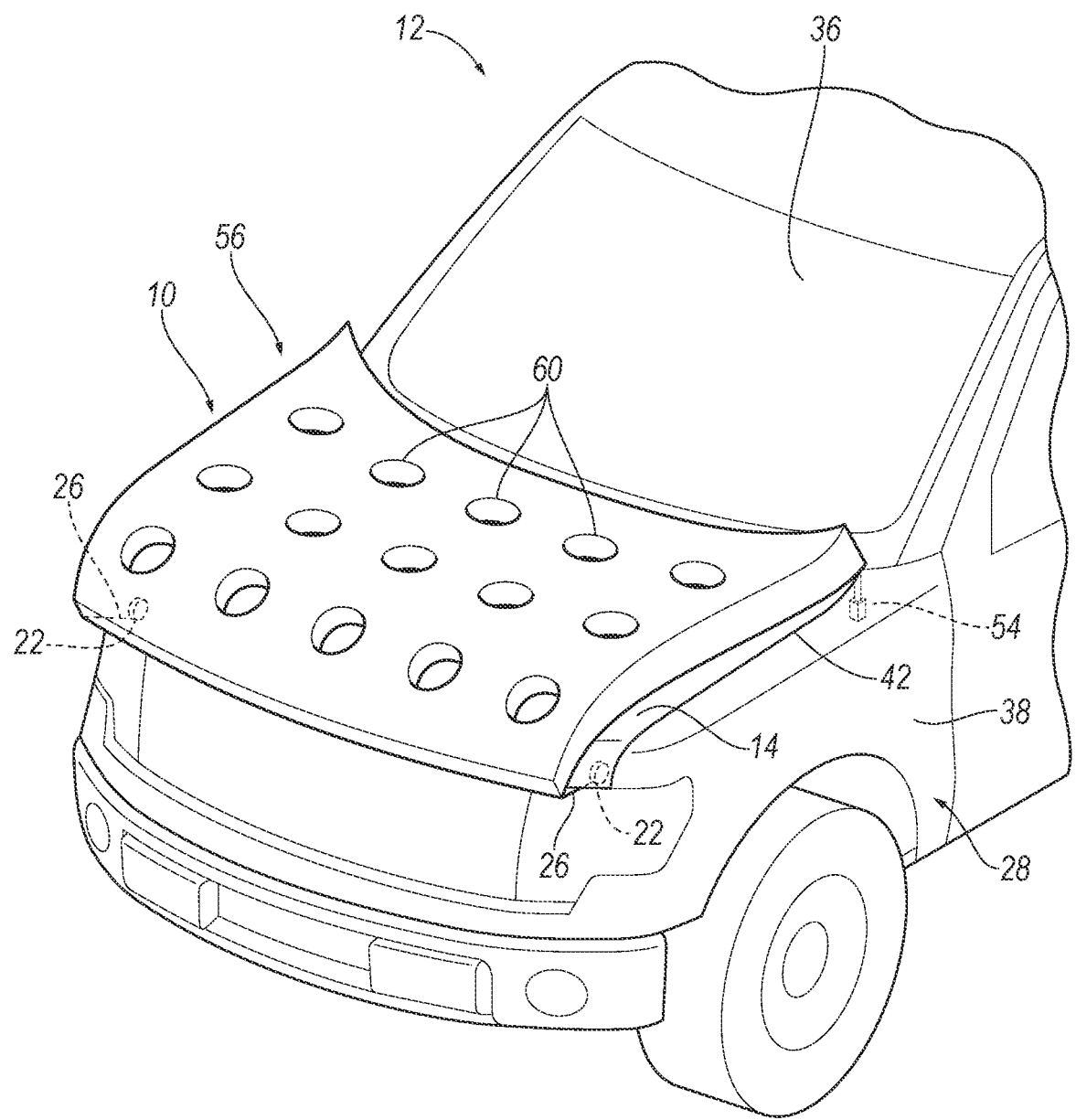
FIG. 6 is a perspective view of the vehicle with another example of the airbag assembly in the inflated position.

The inflator 58 is connected with the airbag 24 to inflate the airbag 24 from an uninflated position (FIGS. 1, 3, 5) to the inflated position (FIGS. 2 and 6). The inflator 58 expands the airbag 24 with inflation medium, such as a gas, to move the airbag 24 from the uninflated position to the inflated position. The inflator 58 may be supported by and connected to the hood 14, e.g., the hood inner 52. The inflator 58 may be, for example, a pyrotechnic inflator that ignites a chemical reaction to generate the inflation medium, a stored gas inflator 58 that releases (e.g., by a pyrotechnic valve) stored gas as the inflation medium, or a hybrid. The inflator 58 may be, for example, at least partially in the inflation chamber to deliver inflation medium directly to the inflation chamber or may be connected to the inflation chamber through fill tubes, diffusers, etc.

The airbag 24 may be fabric, e.g., a woven polymer yarn. The woven polymer yarn may be, for example, nylon 6, 6. Other examples of the woven polymer yarn include polyether ether ketone (PEEK), polyetherketoneketone (PEKK), polyester, etc. The woven polymer yarn may include a coating, such as silicone, neoprene, urethane, etc. For example, the coating may be polyorgano siloxane.

Figure 3:
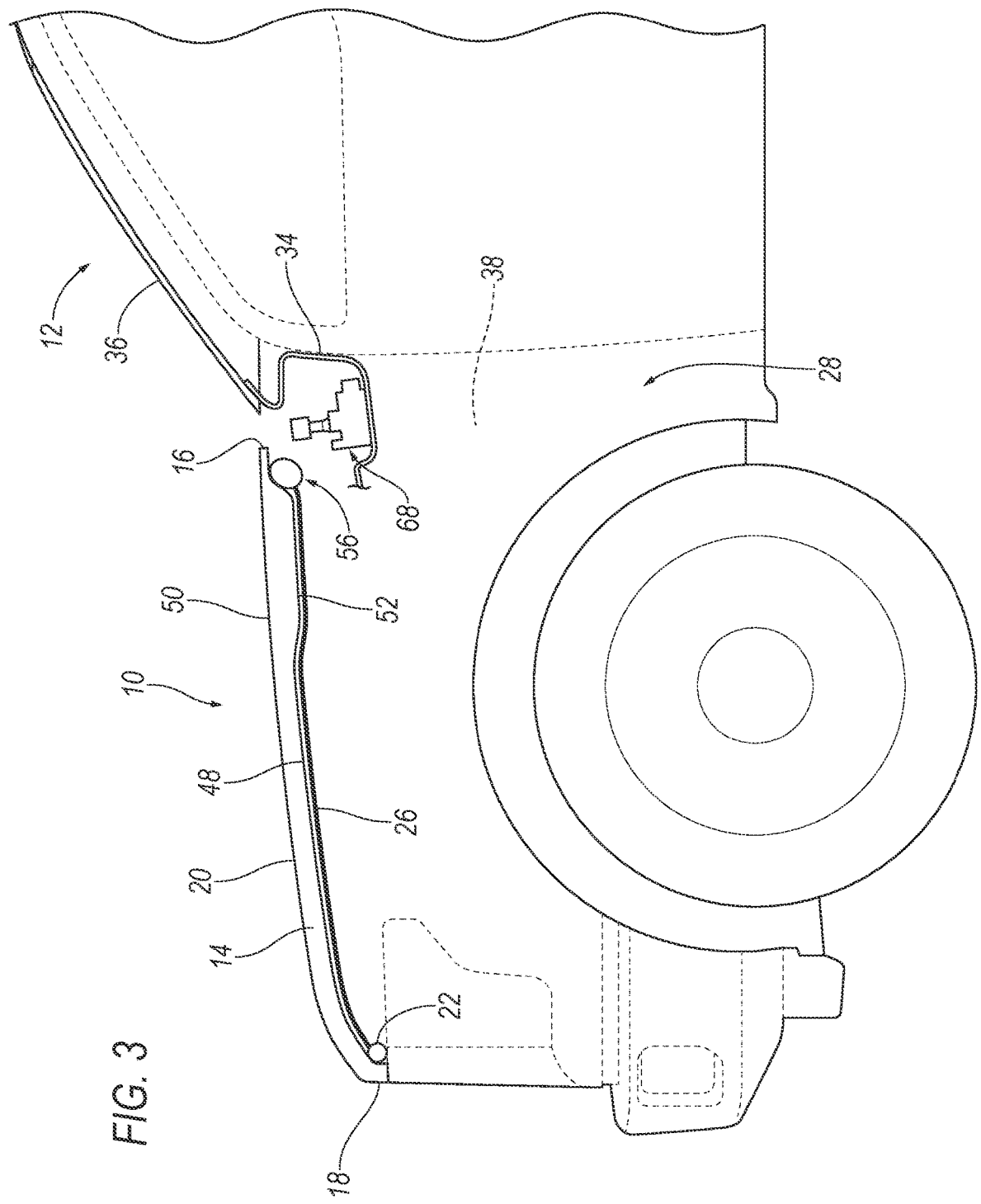
FIG. 3 is a side view of the vehicle with components shown in broken lines to show the hood and the airbag in the uninflated position.
Figure 4:
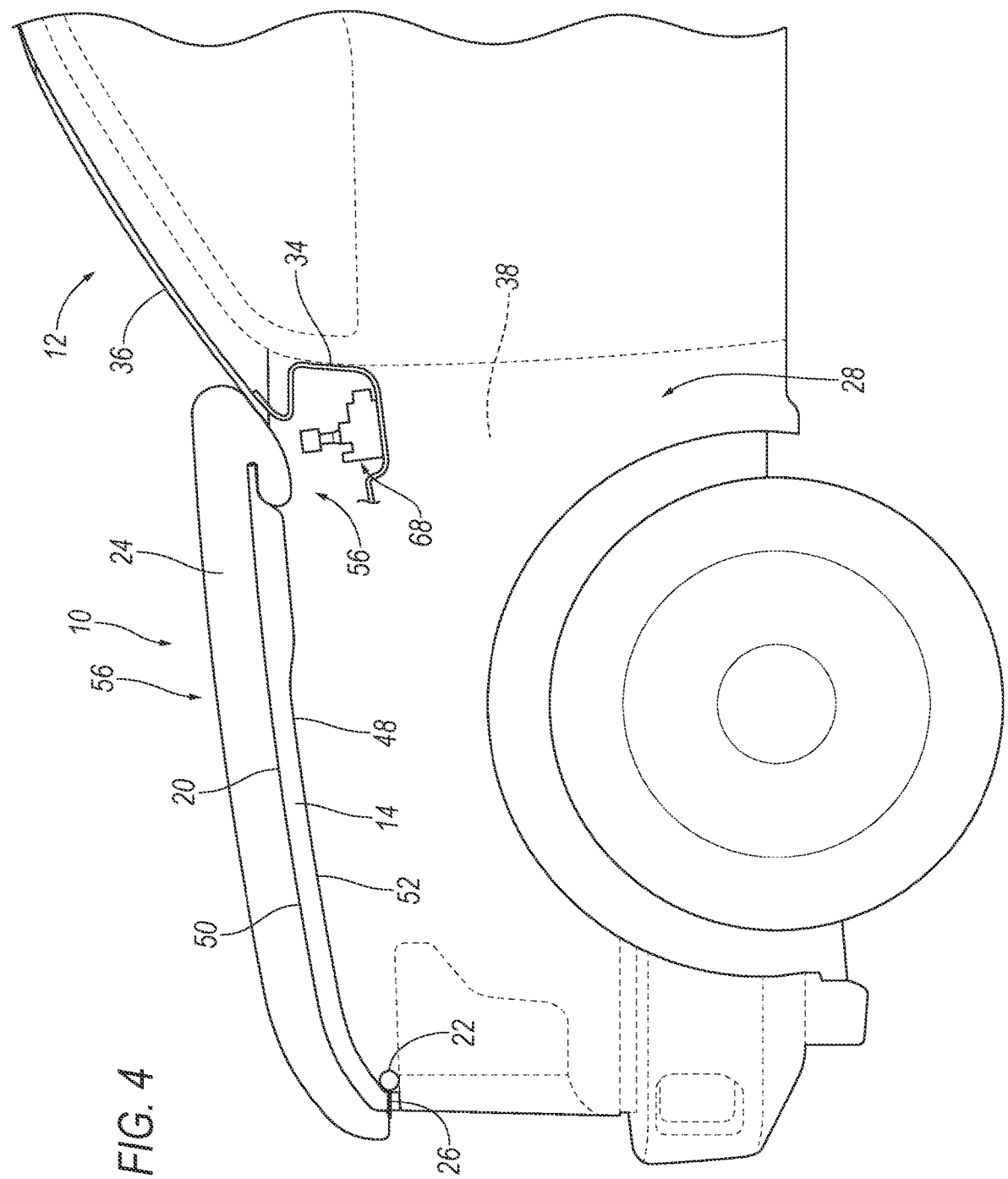
FIG. 4 is the side view of FIG. 3 with the airbag in the inflated position.

The airbag 24 is supported by the hood 14. In other words, the weight of the airbag 24 is borne by the hood 14. The airbag 24 is connected to the hood 14, e.g., to the bottom side 48 of the hood 14 as shown in FIGS. 1, 3, and 4. The airbag 24 may be connected to the hood 14, e.g., the bottom side 48 of the hood 14, with fasteners (such as threaded fasteners, push-pins, Christmas tree fasteners, etc.), adhesive, etc. The airbag 24 in the uninflated position is beneath the bottom side 48 of the hood 14. In the uninflated position, the airbag 24 may be at the vehicle-rearward edge 16 of the hood 14. Specifically, the airbag 24 is unobstructed at the vehicle-rearward edge 16 of the hood 14 so that the airbag 24 may inflate from the bottom side 48, around the vehicle-rearward edge 16, and across the top side 20.

The airbag 24 is inflatable between the windshield 36 and the vehicle-rearward edge 16 of the hood 14. In the inflated position, the airbag 24 extends vehicle-forward from the vehicle-rearward edge 16 toward the vehicle-forward edge 18 along the top side 20 in the inflated position. Specifically, in the inflated position, the airbag 24 is connected to the bottom side 48 of the hood 14 and extends from the bottom side 48 of the hood 14, between the windshield 36 and the vehicle-rearward side of the hood 14, and along the top side 20 of the hood 14 vehicle-forward from the vehicle-rearward side of the hood 14 toward the vehicle-forward side of the hood 14. As described below, the spooler(s) 24 pull the airbag 24 vehicle-forward during and/or after inflation of the airbag 24 to direct the airbag 24 from the bottom side 48 of the hood 14 toward the vehicle-forward side of the hood 14 along the top side 20 of the hood 14. In examples including the hood-lift mechanism 54, the hood-lift mechanism 54 lifts the vehicle-rearward side of the hood 14 relative to the windshield 36 to increase space for travel of the airbag 24 from the uninflated position to the inflated position.

As set forth above, the airbag 24 in the inflated position may extend from the vehicle-rearward edge 16 of the hood 14 toward the vehicle-forward edge 18 of the hood 14. The airbag 24, as an example, may extend at least 90% of the distance from the vehicle-rearward edge 16 toward the vehicle-forward edge 18. In the example shown in the figures, the airbag 24 in the inflated position extends from the vehicle-rearward edge 16 to the vehicle-forward edge 18. In the example shown in the figures, the airbag 24 in the inflated position extends vehicle 12 forward of the vehicle-forward edge 18. The airbag 24 in the inflated position may extend cross-vehicle from the left edge 42 of the hood 14 to the right edge 44 of the hood 14.

One example of the airbag 24 is shown in the inflated position in FIG. 2 and another example of the airbag 24 is shown in the inflated position in FIG. 6. Common numerals are used to identify common features in the airbag 24s of FIGS. 2 and 6. In the example shown in FIG. 2, the airbag 24 has an inflation chamber extending generally continuously from a rearward side of the airbag 24 to a forward side of the airbag 24 and from a left side of the airbag 24 to the right side of the airbag 24. In the example shown in FIG. 6, the airbag 24 has walls defining voids 60 that extend generally vertically through the airbag 24 in the inflated position. The voids 60 reduce the amount of inflation medium to inflate the airbag 24 to the inflated position. The voids 60 are sized so that the airbag 24 controls the kinematics of a pedestrian, including the head of the pedestrian, during pedestrian impact. The walls defining the voids 60 are cylindrical in the example shown in FIG. 6 and alternatively may be of any suitable shape.

The hood assembly 10 includes at least one spooler 22 that pulls the airbag 24 vehicle 12 forward in the inflated position. Specifically, the hood assembly 10 includes a tether 26 extending from the spooler 22 to the airbag 24. The spooler 22 is designed to retract the tether 26 to pull the airbag 24 vehicle forward, as described further below. In the example shown in the figures, the hood assembly 10 includes two spoolers 24 and tether 26. Common numerals are used to identify common features of the spoolers 24 and the tethers 26. The hood assembly 10 may include any suitable number of spoolers 24 and tethers 26, i.e., one or more spooler 22 and tether 26.

The spooler 22 is supported by the hood 14. In other words, the weight of the spooler 22 is borne by the hood 14. The spooler 22 is connected to the hood 14, e.g., to the bottom side 48 of the hood 14 as shown in FIGS. 15. The spooler 22 may be connected to the hood 14, e.g., the bottom side 48 of the hood 14, with fasteners (such as threaded fasteners), welding, adhesive, etc. The spooler 22 is beneath the bottom side 48 of the hood 14. The spooler 22 may be at the vehicle-forward edge 18 of the hood 14. Specifically, the spooler 22 is position to pull the airbag 24 vehicle-forward in the inflated position and across the top side 20.

The tether 26 has an end connected to the airbag 24 and an end engaged with the spooler 22. The spooler 22 is operatively engaged with the tether 26, e.g., the end of the tether 26, to retract the tether 26. The spooler 22 may be pyrotechnically activated. Specifically, the spooler 22 may include a pyrotechnic charge that is activated to retract the tether 26 onto the spooler 22. The pyrotechnic device may be any suitable type such. As one example the spooler 22 may be a rotary actuator, in which the pyrotechnic charge rotates a shaft connected to the tether 26 such that the tether 26 wraps around the shaft. The pyrotechnic charge is combustible to produce a gas. The pyrotechnic charge may be a solid mixture of substances that, when ignited, react to produce the gas. For example, the pyrotechnic charge may be formed of sodium azide ($NaNO_3$), potassium nitrate ($KNO_3$), and silicon dioxide ($SiO_2$), which react to form nitrogen gas ($N_2$). As another example, the spooler 22 may be activated in any suitable way, e.g., may be motorized, magnetically activated, etc.

The tether 26 extends from the spooler 22 to the airbag 24. The tether 26 may be connected to the airbag 24, for example, by stitching, welding, fusing, adhesive, etc., or may be unitary with the airbag 24, e.g., one-piece woven. The tether 26 may be fabric and, in such examples may be of the same type of material as the airbag 24. In other examples, the tether 26 may be a cord, cable, etc., of any suitable material to pull the airbag 24 to vehicle forward as described herein. The tether 26 is engaged with the spooler 22 in any suitable manner so that the spooler 22 retracts the tether 26 as described herein.

The tether 26 may be on the bottom side 48 of the hood 14 when the airbag 24 is in the uninflated position. The tether 26 extends along the gap 46 between the front fender 38 and the hood 14 from the spooler 22 to the airbag 24. The tether 26 is positioned to move through the gap 46 as the airbag 24 inflates from the uninflated position to the inflated position. Specifically, the tether 26 is positioned so that the inflation of the airbag 24 and/or the activation of the spooler 22 pulls the tether 26 through the gap 46 to above the hood 14.

Figure 7:
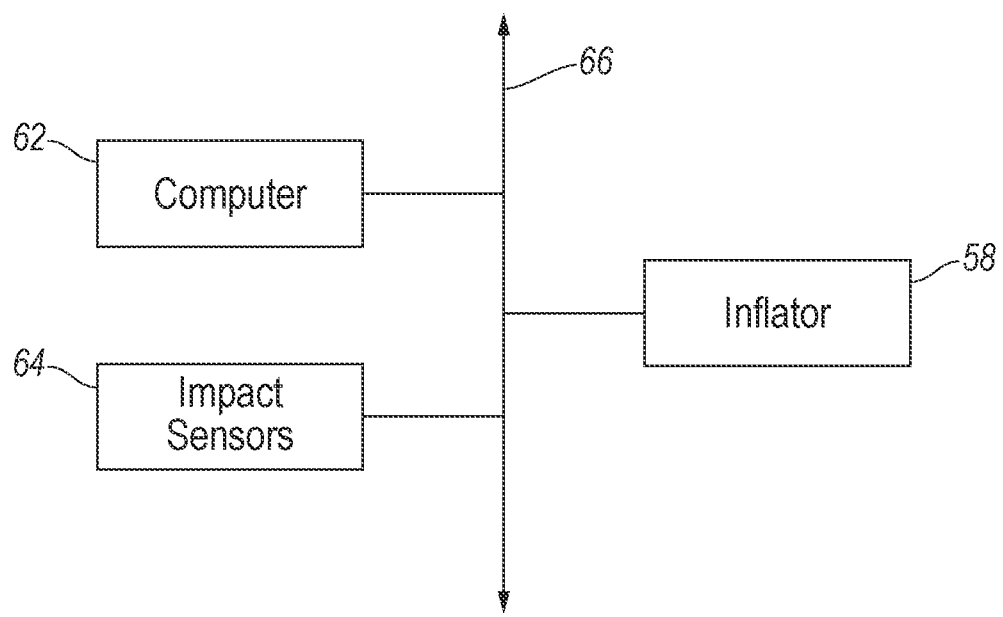
FIG. 7 is a block diagram of a system of the vehicle.

With reference to FIG. 7, the vehicle 12 includes a computer 62 having a processor and a memory storing instructions executable by the processor to deploy the airbag 24 and to activate the spooler 22. The computer 62 is programmed to perform the function described herein. The computer 62 may be, for example, a restraints control module. Use of "in response to," "based on," and "upon determining" herein indicates a causal relationship, not merely a temporal relationship.

The vehicle 12 may include at least one impact sensor 64 for sensing impact of the vehicle 12. The impact sensor may be configured to sense impact with a pedestrian. Alternatively or additionally, the sensor may be configured to sense a pedestrian pre-impact. The impact sensor may be configured to sense conditions of the vehicle 12. The impact sensor may, for example, be further defined as a plurality of impact sensors of the same or of different types. For example, the plurality of impact sensors may include a remote object sensor coupled to controller to generate an object signal in the presence of an object, e.g., a pedestrian, within a field of view. The remote object sensor may include one or more types of sensors including radar, lidar, and/or a vision system. The vision system may include one or more cameras, CCD image sensors, and/or CMOS image sensors, etc. The remote object sensor is configured to sense the presence and the distance of an object from the vehicle 12 and may determine characteristics of the detected objects, such as, radar reflective properties, the area, height, and/or width of the object.

The computer 62 in the figures illustrates an example storage medium. Storage medium may be any non-transitory computer-readable storage medium or machine-readable storage medium, such as an optical, magnetic or semiconductor storage medium. In various implementations, storage medium may be an article of manufacture. In some implementations, storage medium may store computer-executable instructions, such as computer-executable instructions to implement logic flow. Examples of a computer-readable storage medium or machine-readable storage medium may include any tangible media capable of storing electronic data, including volatile memory or non-volatile memory, removable or non-removable memory, erasable or non-erasable memory, writeable or re-writeable memory, and so forth. Examples of computer-executable instructions may include any suitable type of code, such as source code, compiled code, interpreted code, executable code, static code, dynamic code, object-oriented code, visual code, and the like. As used herein, the term "circuitry" may refer to, be part of, or include an Application Specific Integrated Circuit (ASIC), an electronic circuit, a processor (shared, dedicated, or group), and/or memory (shared, dedicated, or group) that execute one or more software or firmware programs, a combinational logic circuit, and/or other suitable hardware components that provide the described functionality. In some implementations, the circuitry may be implemented in, or functions associated with the circuitry may be implemented by, one or more software or firmware modules. In some implementations, circuitry may include logic, at least partially operable in hardware.

The vehicle 12 includes a communication network 66 that can include a bus in the vehicle 12 such as a controller area network (CAN) or the like, and/or other wired and/or wireless mechanisms. Via the communication network 66, the computer 62 may transmit messages to various devices in the vehicle 12 and/or receive messages (e.g., CAN messages) from the various devices, e.g., sensors, an actuator, an human machine interface (HMI), etc. Alternatively or additionally, in cases where the computer 62 includes a plurality of devices, the vehicle 12 communication network may be used for communications between devices represented as the computer in this disclosure. Further, as mentioned below, various controllers and/or sensors may provide data to the computer via the vehicle communication network 66.

With reference to FIG. 7, the computer 62 is in communication with the impact sensor 64, the inflator 58, and the spooler 22 for activating the inflator 58 to inflate the airbag 24 and activating the spooler 22 to pull the airbag 24 vehicle-forward. For example, the computer 62 may provide an impulse to the pyrotechnic charge of the inflator 58 and the pyrotechnic charge of the spooler 22 when the impact sensor 64 senses an impact between the vehicle 12 and a pedestrian.

The disclosure has been described in an illustrative manner, and it is to be understood that the terminology which has been used is intended to be in the nature of words of description rather than of limitation. Many modifications and variations of the present disclosure are possible in light of the above teachings, and the disclosure may be practiced otherwise than as specifically described.

What is claimed is:

1. A vehicle comprising:
   front fenders;
   a hood between the front fenders, the hood having a vehicle-rearward edge, a vehicle-forward edge, and a top side;
   an airbag supported by the hood and inflatable to an inflated position, the airbag extending vehicle-forward from the vehicle-rearward edge toward the vehicle-forward edge along the top side in the inflated position;
   a spooler directly supported by the hood vehicle-forward of the airbag; and
   a tether extending from the spooler to the airbag.

2. The vehicle as set forth in claim 1, wherein the hood includes a bottom side, the airbag being on the bottom side of the hood in an uninflated position.

3. The vehicle as set forth in claim 2, wherein the tether is on the bottom side of the hood when the airbag is in the uninflated position.

4. The vehicle as set forth in claim 3, wherein the hood defines a gap between the hood and one of the fenders, the tether being positioned to move through the gap as the airbag inflates from the uninflated position to the inflated position.

5. The vehicle as set forth in claim 1, wherein the hood defines a gap between the hood and one of the fenders, the tether extending along the gap from the spooler to the airbag.

6. The vehicle as set forth in claim 5:
   wherein the hood defines a second gap between the hood and the other of the fenders; and
   further comprising a second tether extending from the airbag along the second gap.

7. The vehicle as set forth in claim 6, further comprising a second spooler, the second tether extending from the second spooler to the airbag.

8. The vehicle as set forth in claim 1, wherein the airbag extends from the vehicle-rearward edge to the vehicle-forward edge in the inflated position.

9. The vehicle as set forth in claim 1, wherein the spooler is operatively engaged with the tether to retract the tether.

10. The vehicle as set forth in claim 1, wherein the spooler is pyrotechnically-activated.

11. The vehicle as set forth in claim 1, wherein the airbag is at the vehicle-rearward edge of the hood in an uninflated position.

12. The vehicle as set forth in claim 1, further comprising a windshield, the airbag being inflatable between the windshield and the vehicle-rearward edge of the hood.

13. The vehicle as set forth in claim 12, wherein the hood has a bottom side and the airbag is on the bottom side in an uninflated position.

14. The vehicle as set forth in claim 1, further comprising a hood-lift mechanism between the hood and one of the fenders and configured to raise the vehicle-rearward edge of the hood relative to the fender.

15. A hood assembly comprising:
   a hood having a vehicle-rearward edge, a vehicle-forward edge, and a top side;
   an airbag supported by the hood and inflatable to an inflated position, the airbag extending vehicle-forward from the vehicle-rearward edge toward the vehicle-forward edge along the top side in the inflated position;
   a spooler directly supported by the hood, the airbag being between the vehicle-rearward edge and the spooler; and
   a tether extending from the spooler to the airbag.

16. The hood assembly as set forth in claim 15, wherein:
   the hood includes a bottom side and the airbag is on the bottom side of the hood in an uninflated position; and
   the tether is on the bottom side of the hood when the airbag is in the uninflated position.

17. The hood assembly as set forth in claim 15, further comprising:
   a second spooler supported by the hood; and
   a second tether extending from the second spooler to the airbag.

18. The hood assembly as set forth in claim 15, wherein the spooler is operatively engaged with the tether to retract the tether.

19. The hood assembly as set forth in claim 15, wherein the spooler is pyrotechnically-activated.

20. The hood assembly as set forth in claim 15, further comprising a hood-lift mechanism connected to the hood.

* * * * *